United States Patent
Terada et al.

(10) Patent No.: US 7,687,035 B2
(45) Date of Patent: Mar. 30, 2010

(54) REACTION APPARATUS

(75) Inventors: Toshihito Terada, Hamura (JP); Tadao Yamamoto, Tokyo (JP); Naotomo Miyamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 595 days.

(21) Appl. No.: 11/640,754

(22) Filed: Dec. 18, 2006

(65) Prior Publication Data

US 2007/0148063 A1    Jun. 28, 2007

(30) Foreign Application Priority Data

Dec. 27, 2005    (JP)    ............................. 2005-375537

(51) Int. Cl.
*F01N 3/20* (2006.01)
*G05D 23/00* (2006.01)
*G01D 11/26* (2006.01)

(52) U.S. Cl. ........................ 422/105; 422/109; 422/119; 48/127.9

(58) Field of Classification Search ................. 422/105, 422/109, 119, 190, 198; 48/127.9; 429/24, 429/26

See application file for complete search history.

(56) References Cited

U.S. PATENT DOCUMENTS

| 2004/0131540 | A1* | 7/2004 | Fujii et al. | .................. 423/650 |
| 2004/0244290 | A1* | 12/2004 | Yamamoto et al. | ......... 48/127.9 |
| 2005/0249992 | A1* | 11/2005 | Bitoh | .......................... 429/24 |

FOREIGN PATENT DOCUMENTS

JP    2001-295707 A    10/2001

\* cited by examiner

*Primary Examiner*—Walter D Griffin
*Assistant Examiner*—Lessanework Seifu
(74) *Attorney, Agent, or Firm*—Frishauf, Holtz, Goodman & Chick, P.C.

(57) ABSTRACT

A reaction apparatus includes: a chemical reaction unit for causing a reaction of a reactant by being set to a predetermined temperature and by being supplied with the reactant, a heat insulation package for housing the chemical reaction unit therein, an abnormality detector for detecting at least one of a temperature abnormality of the chemical reaction unit and the heat insulation package, and a cooling unit for flowing a cooling fluid to the chemical reaction unit to stop the reaction according to a detection result by the abnormality detector. In the reaction apparatus, the leakage of heat inside the reaction apparatus to outside is prevented when abnormality occurs to the chemical reaction unit and the heat insulation package.

10 Claims, 7 Drawing Sheets

| COMPONENT | INTERNAL CAPACITY [cm$^3$] |
|---|---|
| VAPORIZER | APPROX. 0.01 |
| REFORMER | APPROX. 0.7 |
| CARBON MONOXIDE REMOVER | APPROX. 1.7 |
| COMBUSTOR FOR REFORMER | APPROX. 0.1 |

| COMPONENT | MATERIAL | OPERATION TEMPERATURE [°C] | HEAT CAPACITY [J/K] | COOLING ENERGY [J] |
|---|---|---|---|---|
| VAPORIZER | SUS304+ALUMINA | 102 | 0.06 | -353 |
| REFORMER | SUS304+ALUMINA | 374 | 1.12 | -251 |
| CARBON MONOXIDE REMOVER | SUS304+ALUMINA | 160 | 2.51 | -2 |
| | | | TOTAL | -606 |

REACTION APPARATUS

CROSS-REFERENCE TO RELATED APPLICATION

This application is based upon and claims the benefit of priority from prior Japanese Patent Applications No. 2005-375537, filed Dec. 27, 2005, the entire contents of which is incorporated herein by reference.

BACKGROUND OF THE INVENTION

1. Field of the Invention

The present invention relates to a reaction apparatus in which a reactant is provided to cause a reaction of the reactant, and particularly a reaction apparatus which comprises a chemical reaction unit causing a reaction by heating the chemical reaction unit to a predetermined temperature.

2. Description of the Related Art

Conventionally, in every field of consumer and industrial products, various chemical batteries have been used. For example, the chemical batteries are a primary battery such as an alkaline battery and a manganese battery, and are a secondary battery such as a nickel-cadmium storage battery, a nickel-hydrogen storage battery, and a lithium-ion battery. As opposed to these chemical batteries, in recent years, a research and a development for putting the following power supply system into practical use have been actively performed. The power supply system is a system using a fuel cell which has a less influence (load) on the environment and is capable of realizing energy utilization efficiency extremely as high as approximately 30 to 40%. Moreover, there have also been progressed a research and a development for downsizing the power supply system using the fuel cell as described above to make the power supply system applicable as a power supply unit taking place of such a secondary battery of a mobile information terminal or of a mobile instrument such as a notebook personal computer, thereby extending a usable time thereof.

Incidentally, in the power supply system using the fuel cell, for example, there is a system in which a liquid fuel having hydrogen atom in the composition thereof, such as alcohols and gasoline, is vaporized and the hydrogen is taken out by reforming the vaporized liquid fuel, and the hydrogen gas taken out is provided to the fuel cell in order to generate electricity. In this case, a reaction apparatus which comprises a chemical reaction unit such as a vaporizer for vaporizing the liquid fuel and water, and a reformer for taking out the hydrogen by causing reform reaction between the vaporized liquid fuel and high-temperature steam is required.

Here, the chemical reaction unit such as a vaporizer, a reformer, and the like are heated. By setting the chemical reaction unit to the predetermined temperature (for example, approximately 80 to 120° C. in the vaporizer, and approximately 250 to 400° C. in the reformer), the predetermined chemical reaction proceeds. Therefore, the temperature of a chemical reaction unit such as a vaporizer, a reformer, and the like is maintained at the needed temperature, the heat release to outside is restricted, and the chemical reaction unit is housed in a hollow heat insulation package in order to reduce the loss of the heat energy and to improve the heat efficiency. For this reason, these chemical reaction units are set at comparatively high temperature. However, these chemical reaction units are housed in the insulation package and the heat from those units are prevented from leaking.

However, in case that abnormality occurs in the reaction apparatus, for example, when the heat insulation package is broken by being applied to some impact from the outside, when the heat insulation package is disassembled in an unauthorized manner, when abnormality occurs in the reformer and the like to raise the temperatures thereof, and when abnormality occurs in control for the reformer and the like to raise the temperatures thereof, there is some possibility that the heat of the chemical reaction unit may leak to the outside of the heat insulation package.

SUMMARY OF THE INVENTION

In the reaction apparatus comprising a chemical reaction unit which causes a reaction when the heating of the chemical reaction unit is set to the predetermined temperature, the present invention has a merit to provide a reaction apparatus capable of preventing the heat generated therein from leaking to the outside when the abnormality such as breaking of the reaction apparatus or abnormal increase of the temperature and the like of the chemical reaction unit occurs.

In order to obtain the above described merit, in accordance with a first aspect of the present invention, a reaction apparatus comprises a chemical reaction unit for causing a reaction of a reactant by being set to a predetermined temperature and by being supplied with the reactant, a heat insulation package for housing the chemical reaction unit therein, an abnormality detector for detecting at least one of a temperature abnormality of the chemical reaction unit and the heat insulation package, and a cooling unit for flowing a cooling fluid to the chemical reaction unit to stop the reaction according to a detection result by the abnormality detector.

The cooling fluid is, for example, water, and a space between the heat insulation package and the chemical reaction unit is set to be lower than atmosphere pressure.

The abnormality detector comprises a temperature detecting unit for detecting a temperature of an outer surface of the heat insulation package, and the abnormality detector detects whether the temperature of the outer surface of the heat insulation package exceeds a predetermined upper limit temperature or not and detects the temperature abnormality when the temperature of the outer surface of the heat insulation package exceeds the predetermined upper limit temperature.

The cooling unit comprises a holding container for holding the cooling fluid, and the cooling unit flows the cooling fluid held in the holding container to the chemical reaction unit when the temperature abnormality is detected by the abnormality detector.

The cooling unit comprises a cooling fluid supplying passage for flowing the cooling fluid to the chemical reaction unit, and the holding container holds the cooling fluid in an amount which is not less than an amount of the cooling fluid with which the cooling fluid supplying passage and an area in the chemical reaction unit into which the cooling fluid flows, are filled.

The chemical reaction unit comprises a plurality of chemical reaction sections which communicates with each other, and at least a reactant supplying passage for supplying the reactant to the plurality of chemical reaction sections and a product discharging passage for discharging the product produced by the reaction, and the cooling unit flows the cooling fluid flow into each of the chemical reaction section through at lease one of the reactant supplying passage and the product discharging passage when the temperature abnormality is detected by the abnormality detector.

The reactant is a liquid mixture of water and a liquid fuel which includes hydrogen in a composition of the liquid fuel. The chemical reaction unit comprises at least a vaporizer to which the liquid mixture is supplied to generate a gas mixture by vaporizing the supplied liquid mixture, a reformer to which a gas mixture generated by the vaporizer is supplied to generate a gas containing hydrogen by a reforming reaction, a combustor to which a gas fuel and air is supplied to cause a combustion reaction of the gas fuel by using a combustion catalyst and to heat the plurality of chemical reaction sections by combustion heat, a combustion fuel supplying passage for supplying the gas fuel to the combustor, and an air supplying passage for supplying air to the combustor, and the cooling unit flows the cooling fluid into the chemical reaction unit through at least one of the reactor supplying passage, the product discharging passage, the combustion fuel supplying passage and the air supplying passage.

The chemical reaction unit further comprises an oxidant supplying passage for supplying an oxidant to cause the reaction in one of the plurality of chemical reaction sections. The cooling unit comprises a first opening/closing unit disposed in the product discharging passage, for opening/closing a route for discharging the product, a discharging route disposed in the oxidant supplying passage, for discharging the cooling fluid, a second opening/closing unit for opening/closing the discharging route, and a route controller for controlling the first opening/closing unit and the second opening/closing unit, and when the temperature abnormality is detected by the abnormality detector, the first opening/closing unit is controlled by the route controller and cuts off the route for discharging the product from the product discharging passage, the discharging route is opened by controlling the second opening/closing unit, the cooling fluid flows in a same direction as a direction in which the reactant is supplied from the reactant supplying passage, the cooling fluid flows in an opposite direction to a direction in which the product is discharged from the product supplying passage, and the cooling fluid is discharged from the discharging route.

In order to obtain the merits described above, in accordance with the second aspect of the present invention, a reaction apparatus comprises a chemical reaction unit which comprises a plurality of chemical reaction sections communicating with each other, which cause a reaction of a reactant by being set to the predetermined temperature and by being supplied with the reactant; a combustor to which a gas fuel and air is supplied to cause a combustion reaction of the gas fuel by using a combustion catalyst and to heat the plurality of chemical reaction sections by combustion heat; a reactant supplying passage for supplying the reactant to the plurality of chemical reaction sections; a product discharging passage for discharging a product produced by the reaction; a combustion fuel supplying passage for supplying the gas fuel to the combustor; an air supplying passage for supplying air to the combustor; and a exhaust discharging passage for discharging an exhaust which is a residual of the combustion reaction in the combustor;

a heat insulation package for housing the chemical reaction section therein;

an abnormality detector for detecting a temperature abnormality of the heat insulation package; and a cooling unit for stopping the reaction by flowing a cooling fluid into the plurality of chemical reaction sections through the reactant supplying passage, for discharging the cooling fluid from the product discharging passage, for stopping the combustion reaction by flowing the cooling fluid into the combustor through one of the gas fuel supplying passage and the air supplying passage, and for discharging the cooling fluid from the exhaust discharging passage, according to a detection result of the abnormality detector.

The cooling unit comprises a cooling fluid supplying passage for flowing the cooling fluid into the chemical reaction unit and the combustor, a holding container for holding the cooling fluid in an amount which is not less than an amount of the cooling fluid with which the cooling fluid supplying passage, the plurality of chemical reaction sections, and the combustor are filled, and the cooling unit flows the cooling fluid held in the holding container, into the plurality of chemical reaction sections and the combustor when the temperature abnormality is detected by the abnormality detector.

In order to obtain the merits described above, in accordance with the third aspect of the present invention, a reaction apparatus comprises a chemical reaction unit which comprises a plurality of chemical reaction sections communicating with each other, which cause a reaction of a reactant by being set to the predetermined temperature and by being supplied with the reactant; a combustor to which a gas fuel and air is supplied to cause a combustion reaction of the gas fuel by using a combustion catalyst and to heat the plurality of chemical reaction sections by combustion heat; a reactant supplying passage for supplying the reactant to the plurality of chemical reaction sections; a product discharging passage for discharging a product produced by the reaction; and an oxidant supplying passage for supplying the oxidant to cause the reaction in one of the plurality of chemical reaction sections;

a heat insulation package for housing the chemical reaction section therein;

a abnormality detector for detecting a temperature abnormality of the heat insulation package;

a first opening/closing unit disposed in the product discharging passage, for opening/closing the route for discharging the product;

a discharging route disposed in the oxidant supplying passage, for discharging the cooling fluid;

a second opening/closing unit for opening/closing the discharging route; and a route controller for controlling the first opening/closing unit and the second opening/closing unit;

wherein according to a detection result of the abnormality detector, the first opening/closing unit is controlled by the route controller and cuts off the route for discharging the product from the product discharging passage, and the discharging route is opened by controlling the second opening/closing unit; and a cooling unit flows the cooling fluid in a same direction as a direction in which the reactant is supplied from the reactant supplying passage and flows the cooling fluid in an opposite direction to a direction in which the product is discharged from the product supplying passage to flow the cooling fluid into the plurality of chemical reaction sections to stop the reaction, and discharges the cooling fluid from the discharging route.

The cooling unit comprises a cooling fluid supplying passage for flowing the cooling fluid into the chemical reaction unit and the combustor, a holding container for holding the cooling fluid in an amount which is not less than an amount of the cooling fluid with which the cooling fluid supplying passage and the plurality of chemical reaction sections are filled, and the cooling unit flows the cooling fluid held in the holding container flow, into the chemical reaction section when the temperature abnormality is detected by the abnormality detector.

PREFERRED EMBODIMENTS OF THE PRESENT INVENTION

A description will be made below of a best mode for carrying out the present invention by using the drawings. Note that a variety of technically preferable limitations are imposed on embodiments to be described below in order to carry out the present invention; however, the scope of the present invention is not limited to the following embodiments and illustrated examples.

First Embodiment

First, a description will be made of a first embodiment of a reaction apparatus according to the present invention.

Figure 1:
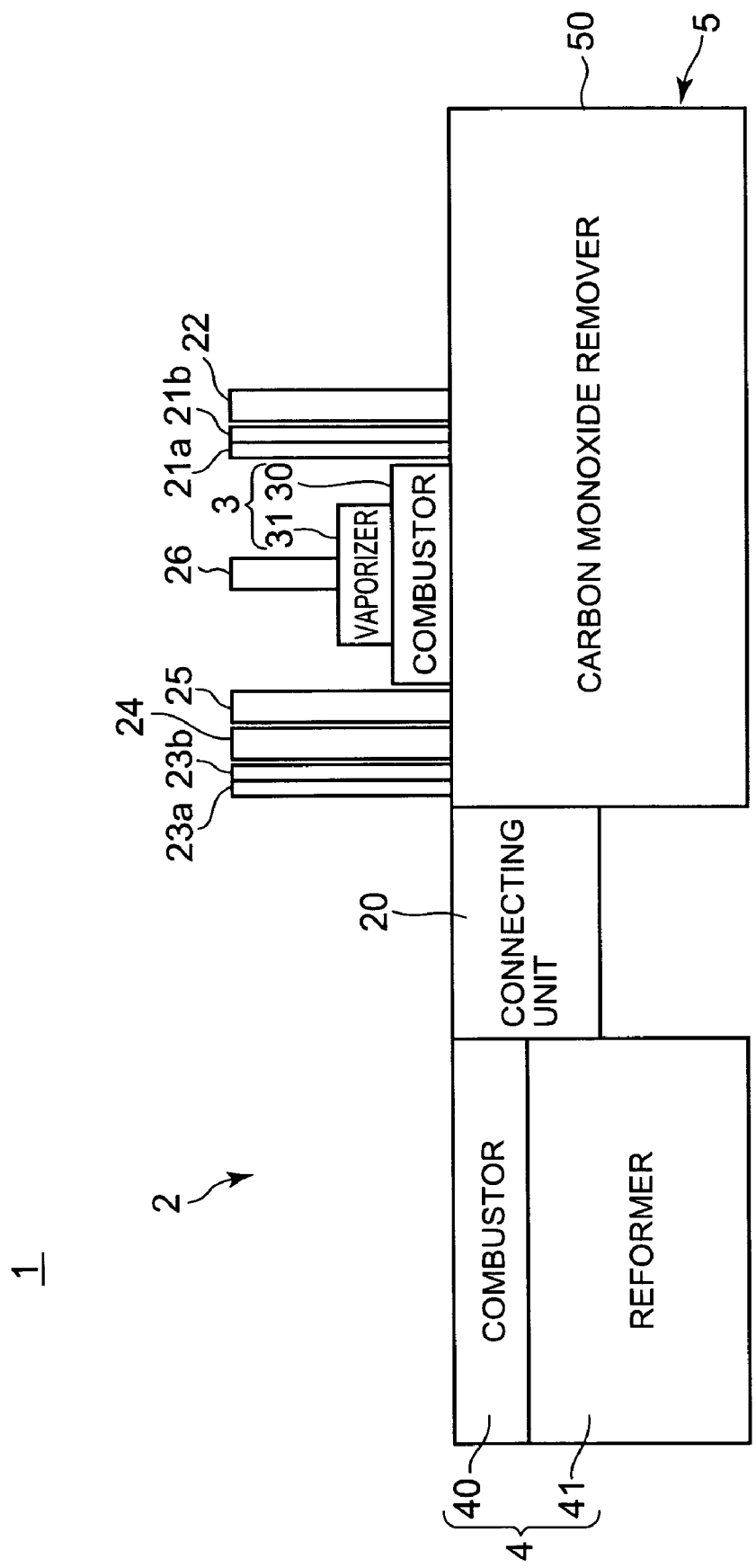
FIG. 1 is a side view showing a schematic construction of a chemical reaction unit in a reaction apparatus according to the present invention.

FIG. 1 is a side view showing a schematic construction of a chemical reaction unit in a reaction apparatus according to the present invention.

The reaction apparatus 1 is an apparatus which generates hydrogen gas for use in a fuel cell. The reaction apparatus 1 comprises the chemical reaction unit 2 shown in FIG. 1 in a heat insulation package 6 (after-mentioned).

The chemical reaction unit 2 comprises a vaporizing unit 3, a connecting unit 20, a reforming unit 4, and a carbon monoxide removing unit 5.

The vaporizing unit 3 comprises a combustor 30 which generates heat (combustion heat) by catalytic combustion, and a vaporizer 31 which vaporizes water and liquid fuel supplied from the outside, by the combustion heat in the combustor 30.

In the combustor 30, a catalyst is provided, which is supplied with the air through a pipe member 21a and with combustion gaseous fuel (for example, hydrogen gas, methanol gas, and the like) through a pipe member 21b, and oxidizes the air and the gaseous fuel, and the combustor 30 generates the heat (combustion heat) by the catalytic combustion. Moreover, a gas mixture of the air and the gaseous fuel, which is burned in the combustor 30, is exhausted through a pipe member 22. Note that the air and the gaseous fuel may be supplied as a gas mixture to the combustor 30. Furthermore, in the pipe members 21a and 21b, check valves which prevent backflows of the fluids are provided.

To the vaporizer 31, a mixed solution in which water and liquid fuel (for example, methanol, ethanol, dimethyl ether, butane, and gasoline) are mixed together is supplied from a fuel container 102 (see after-mentioned FIG. 5) through a pipe member (reactant supplying passage) 26. Note that the water and the liquid fuel may be supplied to the vaporizer 31 separately from each other.

Moreover, a thin-film resistor (not shown in the drawings) also serving as an electric heater and a temperature sensor may be provided on the vaporizer 31 through an insulating layer. In this case, a wire connected to the thin-film resistor is drawn outside of the after-mentioned heat insulation package 6 (see FIG. 2). Then, the vaporizer 31 vaporizes the water and the liquid fuel, which are supplied through the pipe member 26, by the heat derived from the catalytic combustion of the combustor 30 and by heat generated by the thin-film resistor.

In addition, in the pipe member 26, a check valve 260 which prevents a backflow of the fluid is provided.

As shown in FIG. 1, the connecting unit 20 connects the reforming unit 4 and the carbon monoxide removing unit 5 to each other. In the connecting unit 20, a connecting pipe 27 (see after-mentioned FIG. 2) which sends therethrough reactants and products of the reforming unit 4 and the carbon monoxide removing unit 5 and the combustion gaseous fuel, and the like are provided.

The reforming unit 4 includes a combustor 40 which generates heat by the catalytic combustion, and a reformer 41 which generates a gas mixture, which contains hydrogen and carbon dioxide, from water vapor and vaporized liquid fuel by a catalytic reaction.

To the combustor 40, the air is supplied through a pipe member (air supplying passage) 23a and the combustion gaseous fuel (for example, hydrogen gas, methanol gas, and the like) is supplied through a pipe member (combustion fuel supplying passage) 23b. In addition, a catalyst which oxidizes the air and the gaseous fuel is provided in the combustor 40, and the combustor 40 generates the heat by the catalytic combustion.

Moreover, the gas mixture of the air and the gaseous fuel, which is burned in the combustor 40, is exhausted through the pipe member 22. Note that the air and the gaseous fuel may be supplied as the gas mixture to the combustor 40. Moreover, check valves 230 and 230 which prevent backflows of the fluids are provided in the pipe members 23a and 23b. Furthermore, while electricity is generated by an electrochemical reaction of the hydrogen gas in the fuel cell (not shown in the drawings), not-reacted hydrogen gas contained in off-gas exhausted from the fuel cell may be supplied to the combustor 40 and the above-described combustor 30 in a state of being mixed with the air.

Furthermore, the liquid fuel reserved in the fuel container 102 may be vaporized by another vaporizer, and a gas mixture of the fuel thus vaporized and the air may be supplied to the combustor 40 and the combustor 30.

As shown in FIG. 1, to the reformer 41, the gas mixture of the water and the hydrocarbon liquid fuel, which is vaporized by the vaporizer 31, is supplied through the connecting pipe 27, and the heat is applied from the combustor 40. In such a way, the reformer 41 generates the gas mixture, which contains hydrogen and carbon dioxide, by a reforming reaction derived from the catalytic reaction.

Note that, when the fuel is methanol, chemical reactions as in the following formulas (1) and (2) occur in the reformer 41. Moreover, on the reformer 41, a thin-film resistor (not shown in the drawings) also serving as an electric heater and a temperature sensor may be provided through an insulating layer. In this case, a wire connected to the thin-film resistor is drawn outside of the after-mentioned heat insulation package 6.

$$CH_3OH+H_2O \rightarrow 3H_2+CO_2 \quad (1)$$

$$2CH_3OH+H_2O \rightarrow 5H_2+CO+CO_2 \quad (2)$$

The carbon monoxide removing unit 5 includes a carbon monoxide remover 50 which selectively oxidizes a minute quantity of carbon monoxide generated as a by-product by the chemical reaction shown in the above-described formula (2), which exists in the gas mixture generated by the reformer 41, and then converts the carbon monoxide into carbon dioxide, thereby removing the carbon monoxide.

To the carbon monoxide remover 50, heat is applied from the reforming unit 4 through the connecting unit 20, the gas mixture containing hydrogen and carbon dioxide is supplied from the reformer 41 through the connecting pipe 27, and the air is supplied from a pipe 24.

Moreover, the gas mixture in a state where the carbon monoxide is removed therefrom by the carbon monoxide remover 50 is supplied to a fuel electrode of the fuel cell through a pipe member (product exhausting passage) 25. Note that, in the pipe member 25 a check valve (not shown in the drawings) which prevents a backflow of the fluid is provided.

Moreover, on the carbon monoxide remover 50, a thin-film resistor also serving as an electric heater and a temperature sensor may be provided through an insulating layer. In this case, a wire connected to the thin-film resistor is drawn outside of the after-mentioned heat insulation package 6.

Note that the vaporizing unit 3, the reforming unit 4, and the carbon monoxide removing unit 5 in the chemical reaction unit 2 described above are, for example, formed of metal such as stainless steel (SUS304) on a base plate made of ceramics such as alumina.

Figure 2:
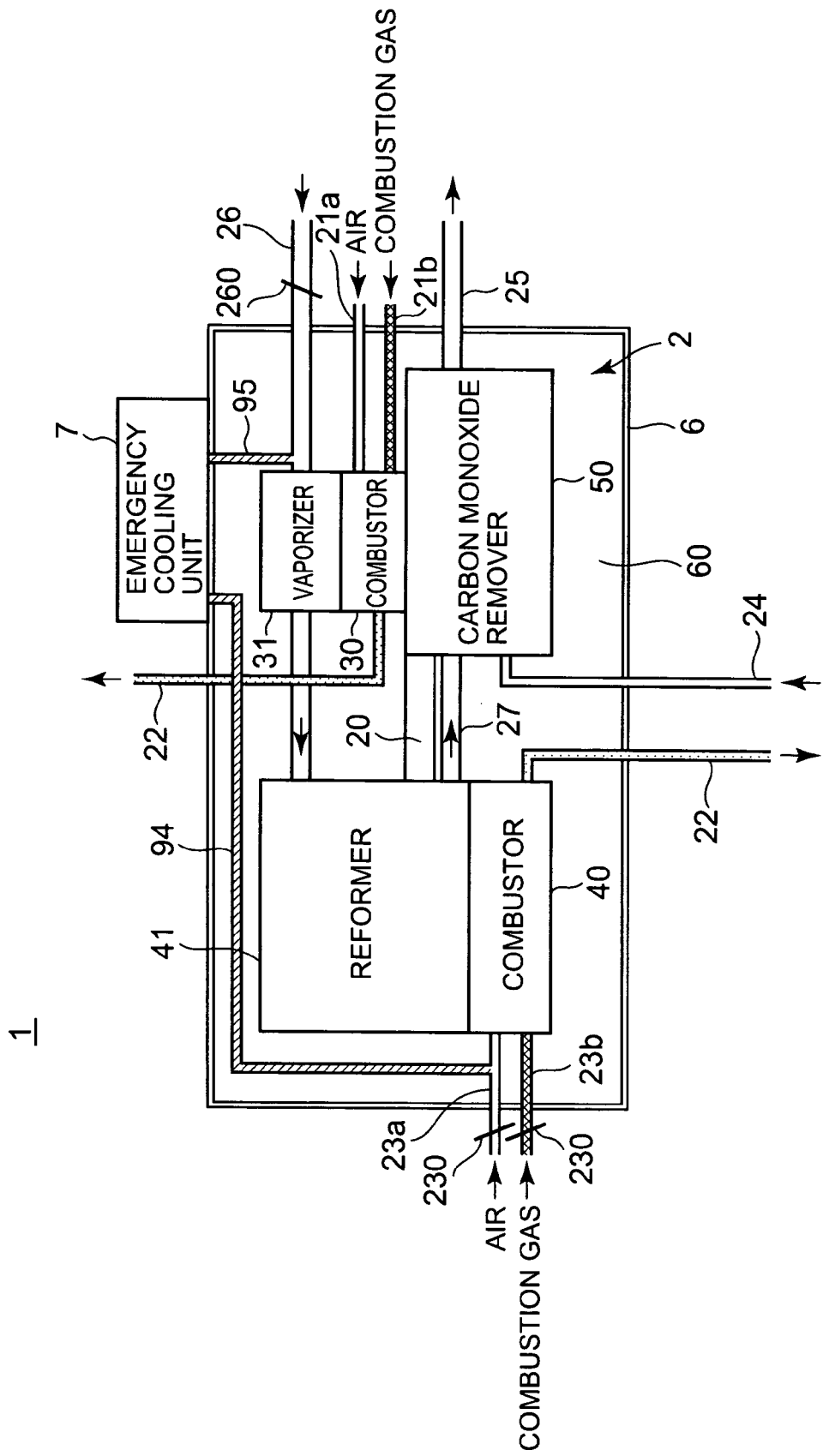
FIG. 2 is a block diagram showing a schematic construction of a reaction apparatus according to the first embodiment.

FIG. 2 is a block diagram showing a schematic construction of the reaction apparatus in the first embodiment.

Figures 3, 4:
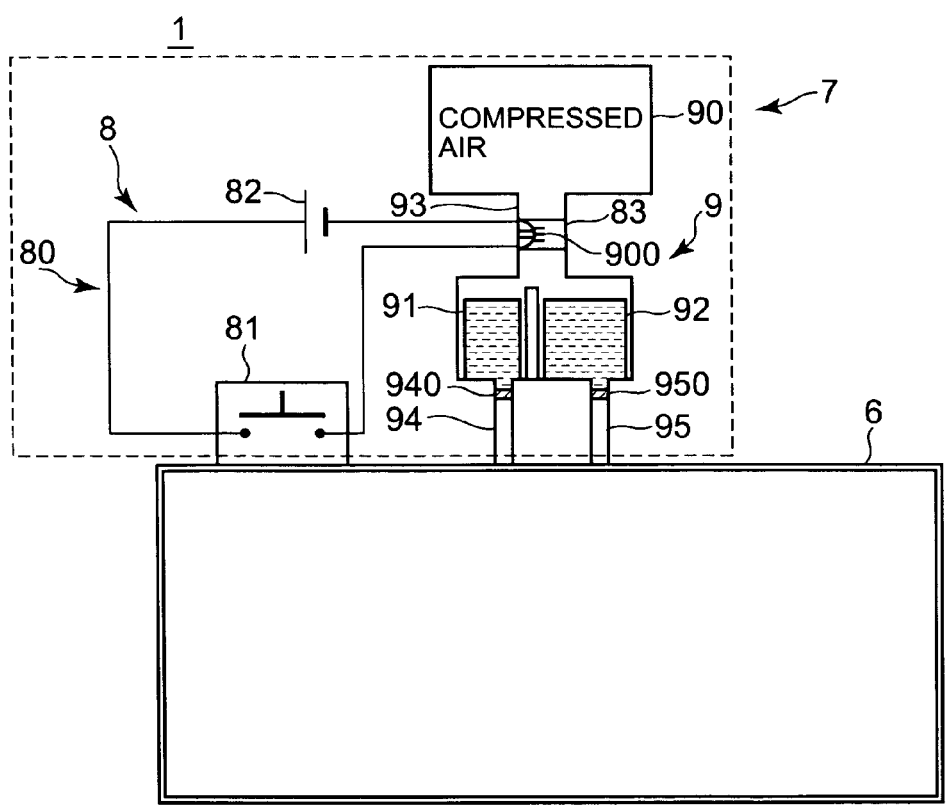
FIG. 3 is a table showing an example of internal capacities of respective reactors of the chemical reaction unit according to the first embodiment.
FIG. 4 is a view showing a schematic construction of an emergency cooling unit according to the first embodiment.

FIG. 3 is a table showing an example of internal capacities of the respective reactors of the chemical reaction unit in the first embodiment.

FIG. 4 is a diagram showing a schematic construction of an emergency cooling unit in the first embodiment.

Note that portions corresponding to those in FIG. 1 are shown while assigning the same reference numbers thereto.

As shown in FIG. 2, the chemical reaction unit 2 is disposed in the heat insulation package 6. Note that the heat insulation package 6 is formed of metal, for example, such as stainless steel (SUS304).

In addition, FIG. 2 is the block diagram conceptually showing the schematic construction of the reaction apparatus 1, and accordingly, for the sake of illustration convenience, arrangements of the pipe members 21 to 26 and a positional relationship between the reformer 41 and the combustor 40 are shown while being changed from those shown in FIG. 1. However, this positional relationship is shown to make the constitution and the operation of the reaction apparatus 1 easier to understand and these arrangements and positional relationship do not limit the actual arrangements and positional relationship.

The heat insulation package 6 has the heat insulation chamber 60 in which the internal pressure (vacuum) is lower than the atmosphere pressure, and surrounds the chemical reaction unit 2 through a heat insulation chamber 60. Therefore, a vacuum heat insulation structure is configured to prevent heat release from the chemical reaction unit 2 to the outside.

Note that, in the present embodiment, a degree of vacuum of the heat insulation chamber 60 is set at 10 Pa or less, preferably, at 1 Pa or less.

Moreover, on an inner wall surface of the heat insulation package 6, there may be provided a radiation shield made of a metal reflection film. In this case, the radiation shield can reduce the heat loss by reflecting a radiation from the chemical reaction unit 2.

Here, a description will be made of an example of dimensions of the reaction apparatus 1 in the present embodiment. With regard to internal dimensions of the heat insulation package 6, for example, a length (in right-and-left direction of the drawing) is approximately 40 mm, a width (in front-and-back direction of the drawing) is approximately 20 mm, and a thickness (in up-and-down direction of the drawing) is approximately 10 mm. A capacity of the heat insulation package 6 is approximately 7 cc. Moreover, in this case, as shown in FIG. 3, the internal capacity of the vaporizer 31 is approximately 0.01 cc, the internal capacity of the reformer 41 is approximately 0.7 cc, the internal capacity of the carbon monoxide remover 50 is 1.7 cc, and the internal capacity of the combustor 40 is 0.1 cc.

As shown in FIG. 2, the emergency cooling unit 7 is provided on an outer surface of the heat insulation package 6.

To the emergency cooling unit 7, pipe members (cooling fluid supplying passage) 94 and 95 are connected, and the pipe member 94 is connected to the pipe member (combustion fuel supplying passage) 23a. Moreover, the pipe member 95 is connected to the pipe member (reactant supplying passage) 26.

As shown in FIG. 4, the emergency cooling unit 7 comprises an abnormality detector 8 and a cooling unit 9. Note that, in FIG. 4, for convenience sake, illustration of an inside of the heat insulation package 6 is omitted.

The abnormality detector 8 detects abnormality of a temperature of the outer surface of the heat insulation package 6. The abnormality detector 8 comprises an abnormality detection circuit 80. In the abnormality detection circuit 80, a switch 81, a built-in battery 82, and a heater 83 are connected in series. In the abnormality detection circuit 80, the switch 81 is, for example, a bimetal switch which is set to turns on, for example, when the temperature of the outer surface reaches 90° C. Moreover, when the switch 81 turns on, electric power is supplied to the heater 83 by the built-in battery 82. Furthermore, the heater 83 generates heat by being supplied with the electric power, and as described later, is embedded in the resin-made valve 900.

The cooling unit 9 flows cooling fluid composed of, for example, water into the inside of the heat insulation package 6, that is, into the flow passages of the reactants and the products in the chemical reaction unit 2 in the present embodiment. The cooling unit 9 comprises an air tank 90 and water tanks (holding containers) 91 and 92.

There is compressed air inside the air tank 90 and the air tank 90 is enclosed by a resin-made valve 900 which is disposed inside the pipe member 93 connected to the air tank 90. In the present embodiment, for example, a volume of the compressed air is approximately 4 cc, and a pressure thereof is approximately 0.8 MPa.

The resin-made valve 900 is formed of thermoplastic resin or the like, and, for example, endures a pressure of approximately 1 MPa. Note that, as the resin applicable to the resin-made valve 900, resin which is excellent in gas impermeability is preferable. Specifically, a material in which polyethylene terephthalate (PET) is coated with polyvinylidene chloride (PVDC), and the like can be used.

In an inside of the resin-made valve 900, the heater 83 of the abnormal detector 8 is embedded, thus making it possible to heat up the resin-made valve 900 by the heater 83.

The air tank 90 is connected to the water tanks 91 and 92 through a pipe member 93.

The water tanks 91 and 92 reserve water, and in the present embodiment, for example, a volume of the water in the water tank 91 is approximately 1 cc, a volume of the water in the water tank 92 is approximately 4 cc, and a thickness of side walls of the water tanks 91 and 92 is approximately 0.1 mm. To the water tanks 91 and 92, the pipe members 94 and 95 are connected on a side opposite to the air tank 90. As shown in FIG. 2, the pipe member 94 communicates with the pipe member 23a, and the pipe member 95 communicates with the pipe member 26.

As shown in FIG. 4, in insides of the pipe members 94 and 95, resin films 940 and 950 which prevent water leakage from the water tanks 91 and 92 are provided. The resin films 940 and 950 are broken, for example, by being applied with a pressure of 0.2 MPa or more. Note that, as resin applicable to the resin film 940 and 950, resin which is excellent in gas impermeability is preferable. Specifically, polyvinylidene chloride and the like can be used.

Subsequently, a description will be made of a schematic construction of a power generation unit 100 comprising the reaction apparatus 1.

Figure 5:
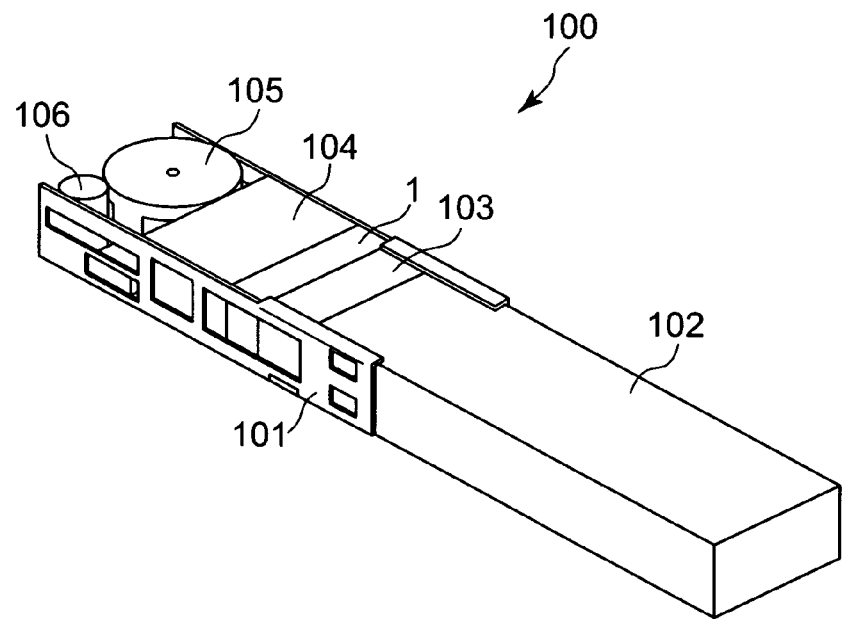
FIG. 5 is a perspective view showing a power generation unit provided in the reaction apparatus according to the present invention.

FIG. 5 is a perspective view showing an example of the power generation unit comprising the reaction apparatus according to the present invention.

Figure 6:
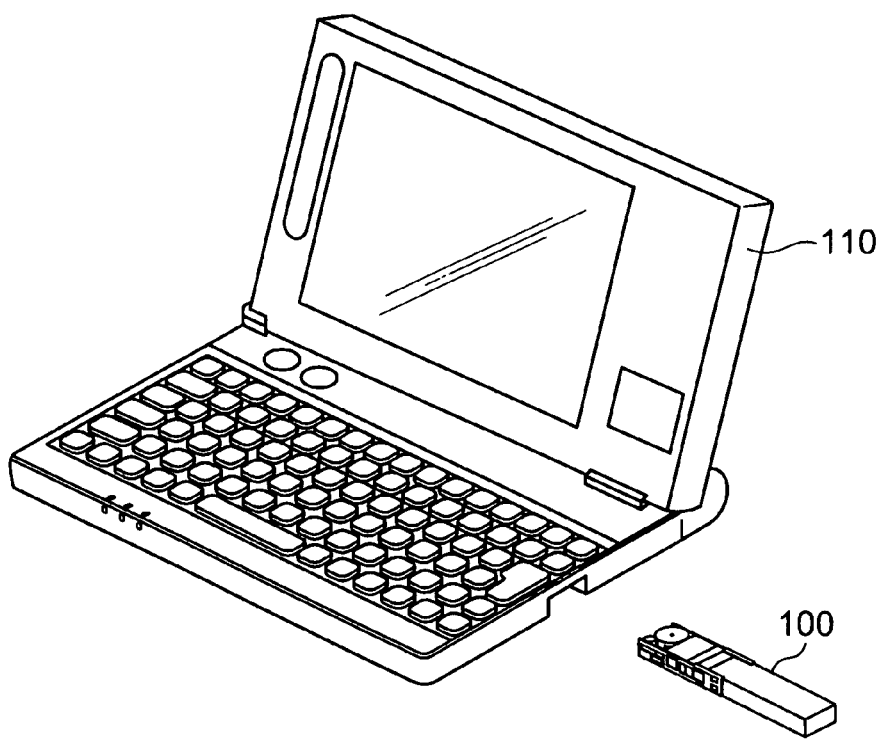
FIG. 6 is a perspective view showing an example of an electronic instrument using the power generation unit as a power supply.

FIG. 6 is a perspective view showing an example an electronic instrument using the power generation unit as a power supply.

As shown in FIG. 5, for example, the power generation unit 100 comprises a frame 101; the fuel container 102 detachable from the frame 101; a flow rate control unit 103 which has a flow passage, a pump, a flow rate sensor, a valve, and the like; the above-described reaction apparatus 1; a power generation module 104 which has the fuel cell; an air pump 105 which supplies the air (oxygen, oxidant) to the reaction apparatus 1 and the power generation module 104; and a power supply unit 106 which has an external interface for electrically connecting to an external instrument, and the like.

Note that the power generation module 104 comprises a humidifier which humidifies the fuel cell, a collector which collects the by-product generated in the fuel cell, and the like. Moreover, the power supply unit 106 comprises a secondary battery which accumulates electricity generated by the power generation module, a DC-DC converter which converts a voltage, and the like.

As shown in FIG. 6, the power generation unit 100 as described above is used, for example, as the power supply of the electronic instrument 110 such as a notebook personal computer. However, the power generation unit 100 may be used, for example, for other electronic instruments such as a PDA, an electronic organizer, a digital camera, a cellular phone, a wrist watch, a register, and a projector.

Subsequently, a description will be made of an operation of the reaction apparatus 1 in the normal operation.

First, the mixed solution of the liquid fuel and the water is supplied from the fuel container 102 to the vaporizer 31, and is vaporized in the vaporizer 31. At this time, reaction heat (combustion heat) generated in the combustor 30 is applied to the vaporizer 31.

Next, when the water vapor and the vaporized liquid fuel flow from the vaporizer 31 into the reformer 41, the gas mixture containing hydrogen and the like is generated in the reformer 41. At this time, reaction heat (combustion heat) generated in the combustor 40 is applied to the reformer 41, and a temperature of the reformer 41 is set at 250° C. to 400° C.

Next, when the gas mixture containing the generated hydrogen and the like and the air (oxidant) which has flown from the pipe member 24 into the carbon monoxide remover 50 flow therein, the carbon monoxide in the gas mixture is oxidized/removed in the carbon monoxide remover 50 concerned. At this time, heat is applied to the carbon monoxide remover 50 through the connecting unit 20 from the reformer 41 side, and a temperature of the carbon monoxide remover 50 is set at 120° C. to 200° C.

Then, the gas mixture mainly containing hydrogen from which the carbon monoxide is removed is supplied through the pipe member 25 to the fuel electrode and the like of the external fuel cell. In the fuel cell, electricity is generated by the electrochemical reaction of the hydrogen gas, and the off-gas containing the not-reacted hydrogen gas is exhausted from the fuel cell.

However, the above-described operation is an operation at an initial stage, and during a power generation operation that follows, the mixed solution continues to be supplied to the vaporizer 31. Then, the air is mixed with the off-gas exhausted from the fuel cell, and a gas mixture thus formed (hereinafter, combustion gas mixture) is supplied to the pipe members 21a and 21b and the pipe members 23a and 23b. The combustion gas mixture supplied to the pipe members 21a and 21b is burned in the combustor 30, and generates the combustion heat. The combustion gas mixture supplied to the pipe members 23a and 23b is burned in the combustor 40, and generates the combustion heat.

Note that, in the above-described operation, it is preferable to detect temperatures of the vaporizer 31, the reformer 41 and the carbon monoxide remover 50 by the thin-film resistors, and to control the temperatures of the vaporizer 31, the reformer 41 and the carbon monoxide remover 50 by using the temperatures thus detected. In such a way, the temperature of the outer surface of the heat insulation package 6 is maintained at approximately 60° C. in the operations described above.

Subsequently, a description will be made of an operation of the emergency cooling unit 7 in the reaction apparatus 1 when abnormality occurs.

First, when the abnormality occurs in the reaction apparatus 1 during such a normal operation as described above, and the temperature of the outer surface of the heat insulation package 6 exceeds, for example, 90° C., the switch 81 of the abnormality detector 8 turns on, and the electric power is supplied from the built-in battery 82 to the heater 83. In such way, the resin-made valve 900 of the air tank 90 is fused by the heat generation of the heater 83.

When the resin-made valve 900 fuses, the compressed air in the air tank 90 pressurizes the water in the water tanks 91 and 92 through the pipe member 93. In such a way, the pressure of 0.2 MPa or more is applied to the resin films 940 and 950 from the water in the water tanks 91 and 92. As a result, the resin films 940 and 950 are broken, and the water in the water tanks 91 and 92 flows out into the pipe members 94 and 95. Note that an initial pressure of the water which flows out at this time becomes approximately 0.7 MPa in the present embodiment.

Then, the water which has flown out into the pipe member 94 sequentially fills insides of the pipe member 23a, the combustor 40 and the pipe member 22, cools the pipe member 23a, the combustor 40, and the pipe member 22, and stops the reaction in the inside of the combustor 40.

Moreover, the water which has flown out into the pipe member 95 sequentially fills insides of the pipe member 26, the vaporizer 31, the reformer 41, the carbon monoxide remover 50 and the pipe member 25, cools the pipe member 26, the vaporizer 31, the reformer 41, the carbon monoxide remover 50, and the pipe member 25, and stops the reactions in the insides of the vaporizer 31, the reformer 41, and the carbon monoxide remover 50.

Note that it is described above that the pipe member 94 is connected to the pipe member 23a, and that the water which has flown out into the pipe member 94 sequentially fills the insides of the pipe member 23a, the combustor 40 and the pipe member 22. However, without being limited to this, the pipe member 94 may be connected to the pipe member 23b, and the water which has flown out into the pipe member 94 may sequentially fill the insides of the pipe member 23b, the combustor 40 and the pipe member 22. In such a way as described above, the reaction in the reaction apparatus 1 is stopped and the reaction apparatus 1 is cooled.

Note that, in the present embodiment, the capacities of the pipe members 22 and 23a and the pipe members 25 and 26 are minute enough to be ignored. Accordingly, the water in the water tank 91 overflows from the pipe member 23a, the combustor 40, and the pipe member 22, and is discharged from the pipe member 22, and the water in the water tank 92 overflows from the pipe member 26, the vaporizer 31, the reformer 41, the carbon monoxide remover 50, and the pipe member 25, and is discharged from the pipe member 25. Moreover, the water which flows into the pipe members 23a and 23b does not flow to the opposite side to the vaporizer 31 by the check valves 230, and the water which flows into the pipe member 26 does not flow to the opposite side to the combustor 40 by the check valve 260. Note that, since a quantity of the water discharged from the pipe members 22 and 25 is little, a mechanism which collects the water thus discharged may be further provided.

Moreover, the description has been made above only of the operation of the emergency cooling unit 7 in the reaction apparatus 1 when the abnormality occurs. However, it is preferable to provide a construction to further stop the supply of the water and liquid fuel from the fuel container 102 to the vaporizer 31, the supply of the air and combustion gaseous fuel to the combustors 30 and 40, and the supply of the air to the carbon monoxide remover 50 as well as to operate the emergency cooling unit 7 when the abnormality occurs.

Next, a description will be made of results of inspecting temperature changes of the respective reaction units according to the present embodiment.

Figures 7, 8:
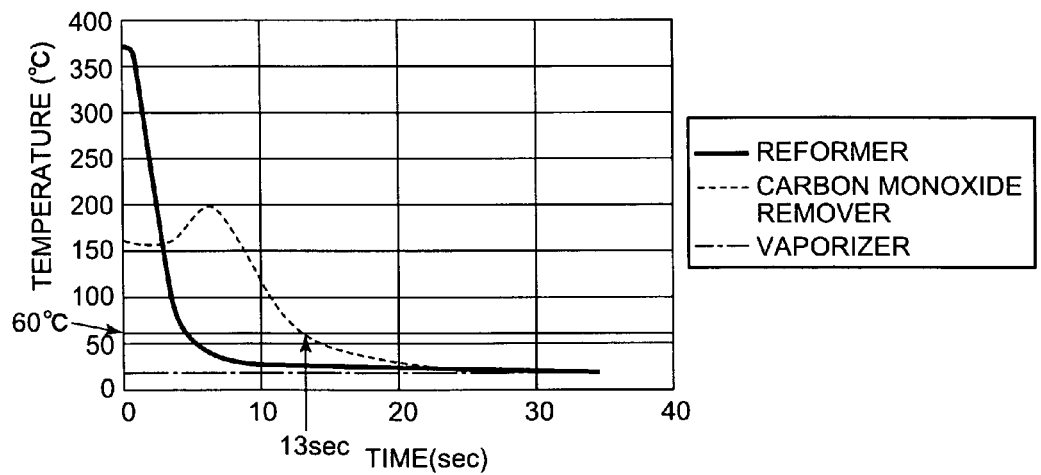
FIG. 7 is a table showing an example of heat capacities of respective reaction units for the purpose of explaining heat quantities necessary to cool the reaction apparatus according to the present invention.
FIG. 8 is a graph showing results of inspecting temperature changes of the respective reaction units of the chemical reaction unit so as to correspond to the first embodiment.

FIG. 7 is a table showing an example of heat capacities of the respective reaction units for the purpose of explaining heat quantities necessary to cool the reaction apparatus according to the present invention.

FIG. 8 is a graph showing results of inspecting the temperature changes of the respective reaction units of the chemical reaction unit so as to correspond to the first embodiment.

In the present embodiment, the operation temperatures and heat capacities of the vaporizer 3, the reformer 4 and the carbon monoxide removing unit 5 have values, for example, as shown in FIG. 7. In this case, heat quantities necessary to cool the vaporizing unit 3, the reformer 4, and the carbon monoxide removing unit 5 down to 60° C. are −606 J in total. Meanwhile, when heat of 606 J is applied to 5 cc (corresponding to a quantity of the water in the water tanks 91 and 92) of water, a temperature of the water rises by 28.8° C. Accordingly, when the temperature of the water in the water tanks 91 and 92 is the room temperature which is 25° C., the temperature of the water only rises to 53.8° C. even if this water cools the reaction apparatus 1. FIG. 8 is a graph showing results of calculating the temperature changes of the respective reaction units in the case where water at a temperature of 20° C. is continuously flown through the pipe member 26 at a flow rate of 0.428 cc/sec. This case shows not the same conditions but approximated conditions to those in the construction in the present embodiment.

As shown in FIG. 8, in this case, in approximately 13 seconds after the water starts to be flown, approximately 5.6 cc of water flows into the chemical reaction unit 2, and the temperatures of the reforming unit 4, the carbon monoxide removing unit 5 and the vaporizing unit 3 individually drop down to 60° C. or less. As described above, according to the construction in the present embodiment, the temperatures of the respective reaction units can be made to drop down to 60° C. or less in approximately ten and several seconds after the abnormality detector 8 detects the abnormality.

As described above, the reaction apparatus 1 according to the present embodiment, the cooling unit 9 flows the water into the heat insulation package 6 when the abnormality of the temperature of the outer surface of the heat insulation package 6 is detected by the abnormality detector 8. Accordingly, the reaction apparatus 1 can be cooled by water. Hence, the heat in the inside of the reaction apparatus 1 can be prevented from leaking to the outside of the heat insulation package 6 when the abnormality occurs in the reaction apparatus 1. Specifically, the heat radiation to the outside can be prevented.

Moreover, the cooling unit 9 stops the reactions in the chemical reaction unit 2 by flowing the water through the flow passages of the reactants and the products in the chemical reaction unit 2. Accordingly, the heat can be surely prevented from leaking to the outside of the heat insulation package 6 when the abnormality occurs in the reaction apparatus 1.

Second Embodiment

Next, a description will be made of a second embodiment of the reaction apparatus according to the present invention. Note that, when portions in the second embodiment, which correspond to those in the first embodiment, are constructed in the same way as those in the first embodiment, the same reference numbers will be assigned thereto, and a description thereof will be simplified or omitted.

Figure 9:
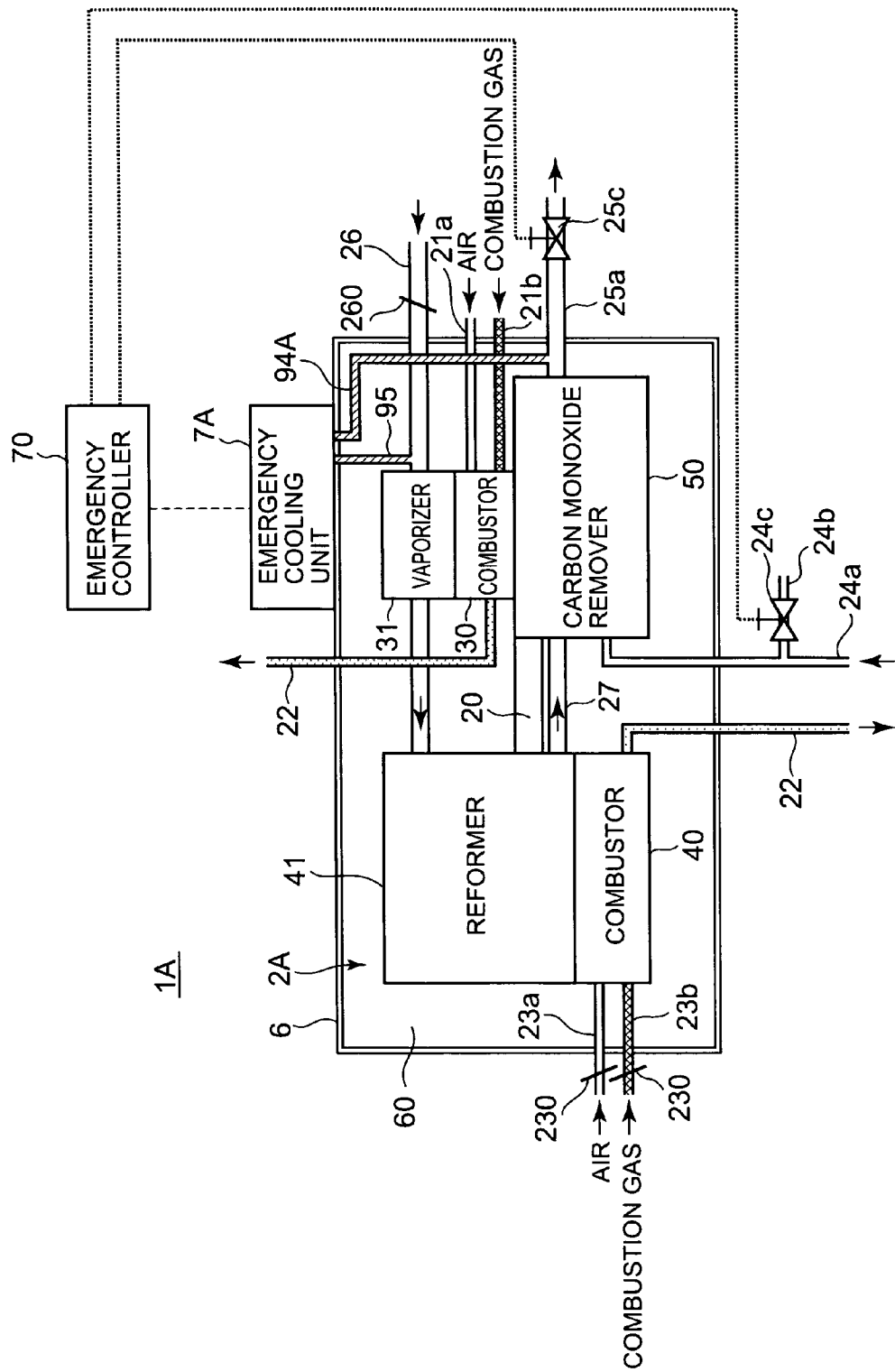
FIG. 9 is a block diagram conceptually showing a schematic construction of a reaction apparatus according to the second embodiment.

FIG. 9 is a block diagram conceptually showing a schematic construction of a reaction apparatus in the second embodiment.

As shown in FIG. 9, in a similar way to FIG. 1 described above, the reaction apparatus 1A comprises a chemical reaction unit 2A. To a carbon monoxide remover 50 of the chemical reaction unit 2A, the air (oxidant) is supplied from a pipe member (oxidant supplying passage) 24a, and a gas mixture from which carbon monoxide is removed in the carbon monoxide remover 50 is supplied to the fuel electrode of the fuel cell through a pipe member (product discharging passage) 25a.

As shown in FIG. 9, to the pipe member 24a, a pipe member 24b (discharge passage) is connected in an outside of a heat insulation package 6, and onto the pipe member 24b, a magnetic valve 24c (second opening/closing unit) is provided. Note that the magnetic valve 24c is in a closed state when the reaction apparatus 1A is normal. Moreover, on an upstream side of a position where the pipe member 24b is connected to the pipe member 24a, that is, on a side apart from the carbon monoxide remover 50, a check valve which prevents a backflow of the fluid is provided. Furthermore, in the pipe member 25a, a magnetic valve 25c (first opening/closing unit) is provided in the outside of the heat insulation package 6. Note that the magnetic valve 25c is in an opened state when the reaction apparatus 1A is normal.

Moreover, the reaction apparatus 1A comprises an emergency cooling unit 7A on an outer surface of the heat insulation package 6. The emergency cooling unit 7A is provided with a similar construction to that of the emergency cooling unit 7 shown in FIG. 4 in the first embodiment. A cooling unit 9A of the emergency cooling unit 7A has a water tank 91A which reserves, for example, 2 cc of water, and a water tank 92A which reserves, for example, 3 cc of water.

To the water tank 91A, a pipe member 94A is connected on an opposite side to an air tank 90, and as shown in FIG. 9, the pipe member 94A communicates with the pipe member 25a. Note that a position where the pipe member 94A is connected to the pipe member 25a is on an upstream side of the magnetic valve 25c, that is, on the carbon monoxide remover 50 side.

Note that FIG. 9 is the block diagram conceptually showing the schematic construction of the reaction apparatus 1A, and accordingly, for the sake of illustration convenience, a positional relationship between the pipe member 94A and the pipe member 95 is shown while being changed from that shown in FIG. 4, and arrangements of pipe members 21 to 26 and the like are shown while being changed from those shown in FIG. 1. However, this positional relationship is shown to make the constitution and the operation of the reaction apparatus 1A easier to understand these positional relationship and arrangements do not limit the actual ones.

To the emergency cooling unit 7A, an emergency controller 70 is connected as a route controller of the present invention.

The emergency controller 70 is connected to the magnetic valves 24c and 25c. The emergency controller 70 closes the magnetic valve 25c and opens the magnetic valve 24c when abnormality is detected by an abnormality detector 8. In such a way, as compared with the case when the abnormality is not detected, the emergency controller 70 changes a route where the reactants and the products in the chemical reaction unit 2 flow through the flow passages.

Specifically, the emergency controller 70 closes the magnetic valve 25c and opens the magnetic valve 24c when the abnormality is detected by the abnormality detector 8. In such a way, water which flows out from the water tank 91A through the pipe member 94A flows in a direction reverse to the flow of the reactants and the products in the chemical reaction unit 2, that is, from the pipe member 25a to the carbon monoxide remover 50, and is then discharged from the pipe member 24b through the magnetic valve 24c.

Moreover, water which flows out from the water tank 92A through the pipe member 95 flows from the pipe member 26 sequentially through a vaporizer 31, a reformer 41, the carbon monoxide remover 50, and the pipe member 24a, and a check valve is provided in the pipe member 24a. Accordingly, the water is discharged from the pipe member 24b through the magnetic vale 24c.

Specifically, by the water which flows out from the water tank 91A and the water which flows out from the water tank 92A, the pipe member 26, the vaporizer 31, the reformer 41, the carbon monoxide remover 50, and the pipe member 25a are cooled from both ends of the flow passages, and reactions in insides of the vaporizer 31, the reformer 41 and the carbon monoxide remover 40 are ended.

According to the reaction apparatus 1A as described in the present embodiment, the vaporizer 31, the reformer 41, and the carbon monoxide remover 50 are individually cooled from both sides of the flow passages. Accordingly, the reaction apparatus 1A can be cooled more rapidly.

Figure 10:
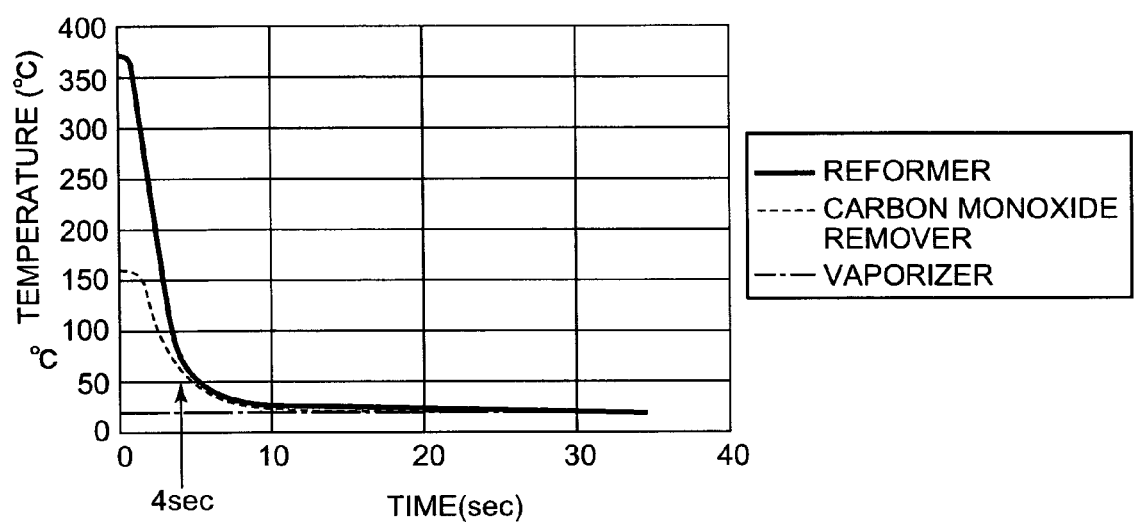
FIG. 10 is a graph showing results of inspecting temperature changes of respective reaction units of the chemical reaction unit 2A so as to correspond to the second embodiment.

FIG. 10 is a graph showing results of inspecting temperature changes of the respective reaction units of the chemical reaction unit 2A so as to correspond to the second embodiment.

FIG. 10 is a graph showing results of calculating the temperature changes of the respective reaction units, so as to correspond to the present embodiment, in the case where water at temperature of 20° C. is continuously flown through the pipe member 94A at a flow rate of 0.43 cc/sec and water at the same temperature is continuously flown through the pipe member 95 at a flow rate of 0.79 cc/sec.

As shown in FIG. 10, in this case, in approximately 4 seconds after the water starts to be flown, 1.72 cc and 3.16 cc of water flows into the chemical reaction unit 2 through the pipe members 94A and 95, respectively. Then, the temperature of the reforming unit 4 drops down to approximately 60° C., the temperature of the carbon monoxide removing unit 5 drops down to approximately 50° C., and the temperature of the vaporizing unit 3 drops down to approximately 20° C. Then, the temperature of the reaction apparatus 1 drops down to 60° C. or less. As described above, according to the construction in the present embodiment, the temperatures of the respective reaction units can be made to drop down to 60° C. or less in approximately a few seconds after the abnormality detector 8 detects the abnormality.

Note that the present invention is not limited to the above-described embodiments. For the present invention, various improvements and design changes may be performed within the scope without departing from the gist of the present invention.

For example, in the above-described respective embodiments, it has been described that the water in the water tanks 91 and 92 and the water tanks 91A and 92A is flown into the chemical reaction unit 2 and 2A by using the pressure of the compressed air in the air tank 90. However, an air pump may be used. Moreover, a pressure of the gas generated in the chemical reaction of the two types of substances to be mixed together may be used. Alternatively, the water may be directly extruded by a combination of a drive device such as a motor and an extrusion mechanism using a screw and the like, or the water may be extruded by pushing lid portions of the water tanks 91 and 92 and the water tanks 91A and 92A.

Moreover, it has been described that the abnormality detector 8 detects the abnormality of the temperature of the outer surface of the heat insulation package 6 by the bimetal switch 81. However, the abnormality may be detected by a combination of comparator circuit with a temperature measurement element such as a thermistor, a temperature fuse, and the like.

Moreover, it has been described that the abnormality detector 8 detects the abnormality of the temperature of the outer surface of the heat insulation package 6. However, the abnormality detector 8 may detect abnormality of a temperature of an inner surface of the heat insulation package 6, or may detect abnormalities of temperatures of outer and inner surfaces of the chemical reaction unit 2 and 2A.

Alternatively, the abnormality detector 8 may detect abnormal rises or drops of the temperatures of the outer and inner surfaces of the heat insulation package 6 and the temperatures of the outer and inner surfaces of the chemical reaction unit 2.

The abnormality detector 8 may detect unauthorized disassembly of the heat insulation package 6.

Furthermore, the abnormality detector 8 may detect abnormal impacts on the reaction apparatuses 1 and 1A.

The abnormality detector 8 may detect fuel leakage and hydrogen leakage in the insides of the reaction apparatuses 1 and 1A or in the inside of the power generation unit 100.

Here, in the case of detecting the abnormal impacts on the reaction apparatuses 1 and 1A, an electric or mechanical acceleration sensor can be used as the switch 81 of the abnormality detector 8.

Moreover, it has been described that the cooling units 9 and 9A cool the reaction apparatuses 1 and 1A by the water in the water tanks 91, 92, 91A and 92A. However, cooling fluid is not limited to the water, and the reaction apparatuses 1 and 1A may be cooled by other cooling fluid. Note that, as such fluid, the one with a high specific heat is preferable.

Moreover, it has been described that the resin films 940 and 950 are broken by the pressure of 0.2 MPa or more. However, the resin films 940 and 950 may be formed of thermoplastic resin and the like, and the resin films 940 and 950 may be broken by a heater which turns on when the abnormality is detected by the abnormality detector 8. In this case, it is preferable to provide a heat insulation layer by polystyrene or the like on water-side portions of the resin films 940 and 950 from a viewpoint of restricting the heating of the water tanks 91 and 92 and the water tanks 91A and 92A, which is caused by the heat of the heater. It is more preferable that each of the resin films 940 and 950 be constructed to have four layers of polystyrene, PVDC, PET and PVDC in order from the water side.

Moreover, it has been described that the cooling units 9 and 9A flow the water into the chemical reaction unit 2 and 2A. However, the cooling units 9 and 9A may further flow the water into the unit outside of the chemical reaction unit 2 and 2A and in the inside of the heat insulation package 6.

Furthermore, it has been described that the heat insulation package 6 is made of the metal. However, the heat insulation package 6 may be made of glass. Note that, preferably, the heat insulation package 6 is made of glass resistant to thermal variations so as not to be broken by being cooled rapidly.

What is claimed is:

1. A reaction apparatus, comprising:
    a chemical reaction unit for causing a reaction of a reactant by being set to a predetermined temperature and by being supplied with the reactant;
    a heat insulation package for housing the chemical reaction unit therein;
    an abnormality detector for detecting a temperature abnormality of at least one of the chemical reaction unit and the heat insulation package; and
    a cooling unit for flowing a cooling fluid to the chemical reaction unit to stop the reaction according to a detection result by the abnormality detector;
    wherein the chemical reaction unit comprises a plurality of chemical reaction sections which communicate with each other, and at least a reactant supplying passage for supplying the reactant to the plurality of chemical reaction sections and a product discharging passage for discharging a product produced by the reaction, and wherein the cooling unit flows the cooling fluid flow into each of the chemical reaction sections through at least one of the reactant supplying passage and the product discharging passage when the temperature abnormality is detected by the abnormality detector;
    wherein the reactant is a liquid mixture of water and a liquid fuel which includes hydrogen in a composition of the liquid fuel, and wherein the chemical reaction unit comprises a vaporizer to which the liquid mixture is supplied to generate a gas mixture by vaporizing the supplied liquid mixture, and a reformer to which the gas mixture generated by the vaporizer is supplied to generate a gas containing hydrogen by a reforming reaction;
    wherein the chemical reaction unit further comprises a combustor to which a gas fuel and air are supplied to cause a combustion reaction of the gas fuel by using a combustion catalyst to heat the plurality of chemical reaction sections by combustion heat, a combustion fuel supplying passage for supplying the gas fuel to the combustor, and an air supplying passage for supplying air to the combustor, and wherein the cooling unit flows the cooling fluid into the chemical reaction unit through at least one of the reactor supplying passage, the product discharging passage, the combustion fuel supplying passage, and the air supplying passage; and
    wherein the chemical reaction unit further comprises an oxidant supplying passage for supplying an oxidant to cause the reaction in one of the plurality of chemical reaction sections, wherein the cooling unit comprises a first opening/closing unit disposed in the product discharging passage, for opening/closing a route for discharging the product, a discharging route disposed in the oxidant supplying passage, for discharging the cooling fluid, a second opening/closing unit for opening/closing the discharging route, and a route controller for controlling the first opening/closing unit and the second opening/closing unit, and wherein when the temperature abnormality is detected by the abnormality detector, the first opening/closing unit is controlled by the route controller to cut off the route for discharging the product from the product discharging passage, the discharging route is opened by controlling the second opening/closing unit, the cooling fluid flows in a same direction as a direction in which the reactant is supplied from the reactant supplying passage, the cooling fluid flows in an opposite direction to a direction in which the product is discharged from the product discharge passage, and the cooling fluid is discharged from the discharging route.

2. The reaction apparatus according to claim 1, wherein the cooling fluid is water.

3. The reaction apparatus according to claim 1, wherein a space between the heat insulation package and the chemical reaction unit is set to have a pressure that is lower than atmospheric pressure.

4. The reaction apparatus according to claim 1, wherein the abnormality detector comprises a temperature detecting unit for detecting a temperature of an outer surface of the heat insulation package.

5. The reaction apparatus according to claim 4, wherein the abnormality detector detects whether or not the temperature of the outer surface of the heat insulation package exceeds a predetermined upper limit temperature and detects the temperature abnormality when the temperature of the outer surface of the heat insulation package exceeds the predetermined upper limit temperature.

6. The reaction apparatus according to claim 1, wherein the cooling unit comprises a holding container for holding the cooling fluid, and the cooling unit flows the cooling fluid held in the holding container to the chemical reaction unit when the temperature abnormality is detected by the abnormality detector.

7. The reaction apparatus according to claim 6, wherein the cooling unit comprises a cooling fluid supplying passage for flowing the cooling fluid to the chemical reaction unit, and the holding container holds the cooling fluid in an amount which is not less than an amount of the cooling fluid with which the cooling fluid supplying passage and an area in the chemical reaction unit into which the cooling fluid flows, are filled.

8. The reaction apparatus according to claim 1, wherein the chemical reaction unit further comprises a carbon monoxide remover for removing carbon monoxide which is a by-product of the reforming reaction, by changing the carbon monoxide to carbon dioxide.

9. A reaction apparatus, comprising:
- a chemical reaction unit which comprises (i) a plurality of chemical reaction sections communicating with each other, which cause a reaction of a reactant by being set to a predetermined temperature and by being supplied with the reactant, (ii) a combustor to which a gas fuel and air are supplied to cause a combustion reaction of the gas fuel by using a combustion catalyst to heat the plurality of chemical reaction sections by combustion heat, (iii) a reactant supplying passage for supplying the reactant to the plurality of chemical reaction sections, (iv) a product discharging passage for discharging a product produced by the reaction, and (v) an oxidant supplying passage for supplying an oxidant to cause the reaction in one of the plurality of chemical reaction sections;
- a heat insulation package for housing the chemical reaction unit therein;
- an abnormality detector for detecting a temperature abnormality of the heat insulation package;
- a first opening/closing unit disposed in the product discharging passage, for opening/closing a route for discharging the product;
- a discharging route disposed in the oxidant supplying passage, for discharging a cooling fluid;
- a second opening/closing unit for opening/closing the discharging route; and
- a route controller for controlling the first opening/closing unit and the second opening/closing unit;
- wherein according to a detection result of the abnormality detector, the first opening/closing unit is controlled by the route controller to cut off the route for discharging the product from the product discharging passage, and the discharging route is opened by controlling the second opening/closing unit; and
- wherein a cooling unit flows the cooling fluid in a same direction as a direction in which the reactant is supplied from the reactant supplying passage and flows the cooling fluid in an opposite direction to a direction in which the product is discharged from the product discharging passage to flow the cooling fluid into the plurality of chemical reaction sections to stop the reaction, and discharges the cooling fluid from the discharging route.

10. The reaction apparatus according to claim 9, wherein the cooling unit comprises:
- a cooling fluid supplying passage for flowing the cooling fluid into the chemical reaction unit; and
- a holding container for holding the cooling fluid in an amount which is not less than an amount of the cooling fluid with which the cooling fluid supplying passage and the plurality of chemical reaction sections are filled; and
- wherein the cooling unit flows the cooling fluid held in the holding container into the chemical reaction unit when the temperature abnormality is detected by the abnormality detector.

* * * * *